United States Patent [19]
Rosenberg

[11] Patent Number: 6,027,081
[45] Date of Patent: Feb. 22, 2000

[54] ARTICLE HOLDER

[75] Inventor: Melvyn Rosenberg, Ramat Gan, Israel

[73] Assignee: Innoscent Ltd., Tel Hashomer, Israel

[21] Appl. No.: 09/013,024

[22] Filed: Jan. 26, 1998

[51] Int. Cl.[7] .................................................. A47F 1/04
[52] U.S. Cl. .......................... 248/37.6; 211/65; 211/70.1; 248/300; 248/309.1
[58] Field of Search .............................. 248/213.2, 37.6, 248/300, 302, 309.1; 211/65, 70.1, 70.7

[56] References Cited

U.S. PATENT DOCUMENTS

| | | |
|---|---|---|
| 419,585 | 1/1890 | Crapo . |
| 731,597 | 6/1903 | McGill . |
| 891,142 | 6/1908 | Bunnell .................................... 248/37.6 |
| 936,552 | 10/1909 | Morrill ................................. 248/300 X |
| 1,062,107 | 5/1913 | Lyon . |
| 1,176,009 | 3/1916 | Weimar ............................ 248/213.2 X |
| 1,188,147 | 6/1916 | Butler . |
| 1,263,925 | 4/1918 | Polk . |
| 1,304,628 | 5/1919 | Thornton ................................ 248/37.6 |
| 1,483,833 | 2/1924 | Potter ...................................... 248/37.6 |
| 1,571,000 | 1/1926 | Eustis . |
| 1,752,522 | 4/1930 | Eckelman ............................... 248/37.6 |
| 1,776,655 | 9/1930 | Estes . |
| 1,796,243 | 3/1931 | Coughlin . |
| 1,928,995 | 10/1933 | De Biasi ........................... 248/213.2 X |
| 2,201,104 | 5/1940 | Edick . |
| 2,508,707 | 5/1950 | Davis . |
| 2,605,624 | 8/1952 | Halladay ................................. 248/37.6 |
| 2,696,630 | 12/1954 | Mountain ............................... 211/65 X |
| 2,787,072 | 4/1957 | Vogel ..................................... 211/65 X |
| 3,233,743 | 2/1966 | Di Tirro . |
| 4,515,332 | 5/1985 | Scharfy ............................... 211/70.7 X |
| 5,730,405 | 3/1998 | Nichols, IV ......................... 248/213.2 |

Primary Examiner—Derek J. Berger
Attorney, Agent, or Firm—Benjamin J. Barish

[57] ABSTRACT

A holder for an article of the type having a handle at one end and a working member at the opposite end, includes first and second fingers or arms extending in substantially parallel, spaced relation to each other to receive the article handle between them. One described embodiment is constructed as a flat blank of stiff sheet material for holding toothbrushes or similar articles. The flat blank is provided with cut and fold lines to define a pair of side sections normally spaced laterally apart, and a pair of strips separated from each other by cut lines and joined to the side sections by fold lines such that when the two side sections are moved toward each other to a mounting condition, the pair of strips become bowed outwardly of the side sections to serve as the upper and lower arms for supporting the articles between them.

8 Claims, 6 Drawing Sheets

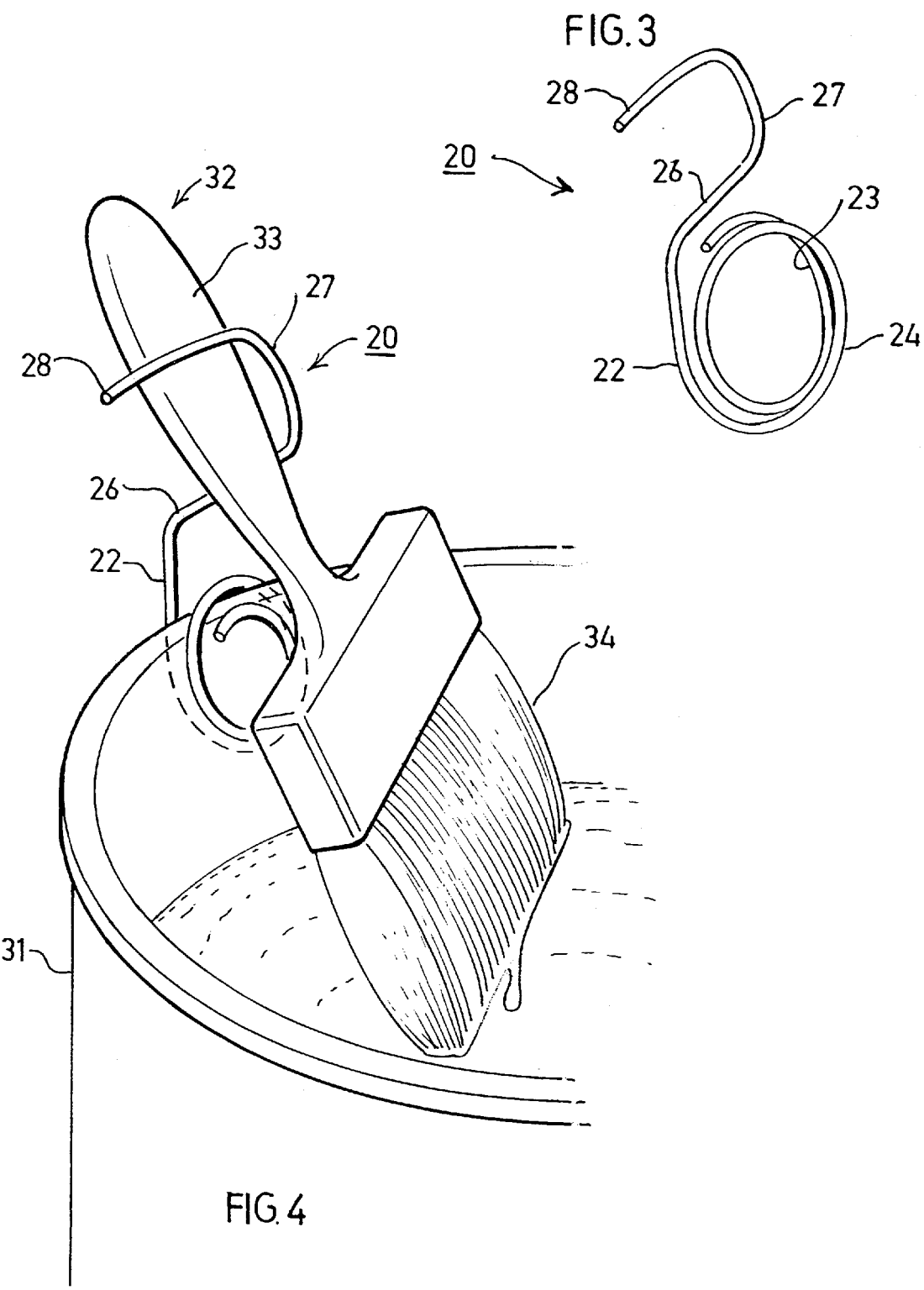

ARTICLE HOLDER

FIELD OF THE INVENTION

The present invention relates to holders for conveniently holding various types of articles when not being used. The invention is particularly useful for holding articles such as stirring spoons, paint brushes, and particularly toothbrushes, and the invention is therefore described below with respect to such applications, but it will be appreciated that the invention could be used in many other applications as well.

BRIEF SUMMARY OF THE INVENTION

According to one aspect of the present invention, there is provided a flat blank of stiff sheet material for mounting to a vertical member to serve as an article holder for holding toothbrushes or similar articles, the flat blank being configured, and being provided with cut lines and fold lines, to define: a pair of side sections normally spaced laterally apart; and a pair of strips separated from each other by cut lines and joined to the side sections by fold lines such that when the two side sections of the flat blank are moved toward each other to a mounting condition for mounting the blank to the supporting member to serve as an article holder, the pair of strips become bowed outwardly of the side sections in the same direction for their complete lengths to said side sections and produce upper and lower arms for supporting the articles between them.

According to further features in the described preferred embodiment of this aspect of the invention, the cut lines and fold lines define, in the mounting condition of the blank, upper and lower bowed arms in which the lower bowed arm extends below is of a length longer than, and is spaced forwardly, of the upper bowed arm. Further, the pair of strips defining the bowed arms in the mounting condition of the blank are cut with cut lines of ripple configuration to define facing edges formed with a plurality of concave recesses tending to self-center the articles when engaging and supported by the bowed arms.

Article holder blanks constructed in accordance with the foregoing features can be produced in volume and at low cost because they merely require a simple stamping operation. Moreover, since the blanks are flat, they can be packaged in flat form, thereby requiring a minimum of space during storage, transportation, or other handling of the blanks before actual use as article holders.

It will be appreciated that the holder could be used for many other applications, such as for supporting various tools to a supporting member, etc.

Further features, advantages and applications of the invention will be apparent from the description below.

BRIEF DESCRIPTION OF THE DRAWINGS

The invention is herein described, by way of example only, with reference to the accompanying drawings, wherein:

FIG. 3 illustrates a second form of holder constructed in accordance with the present invention;

FIG. 4 illustrates the holder of FIG. 3 used for holding a paint brush over a can of paint;

DESCRIPTION OF PREFERRED EMBODIMENTS

Figure 1:
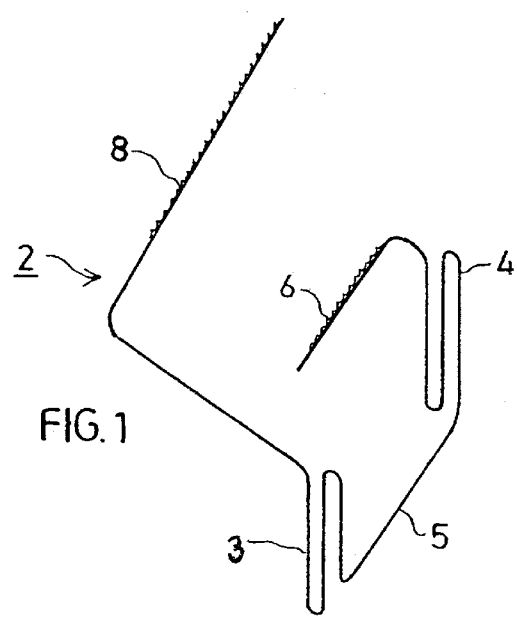
FIG. 1 illustrates one form of holder constructed in accordance with the present invention.
Figure 2:
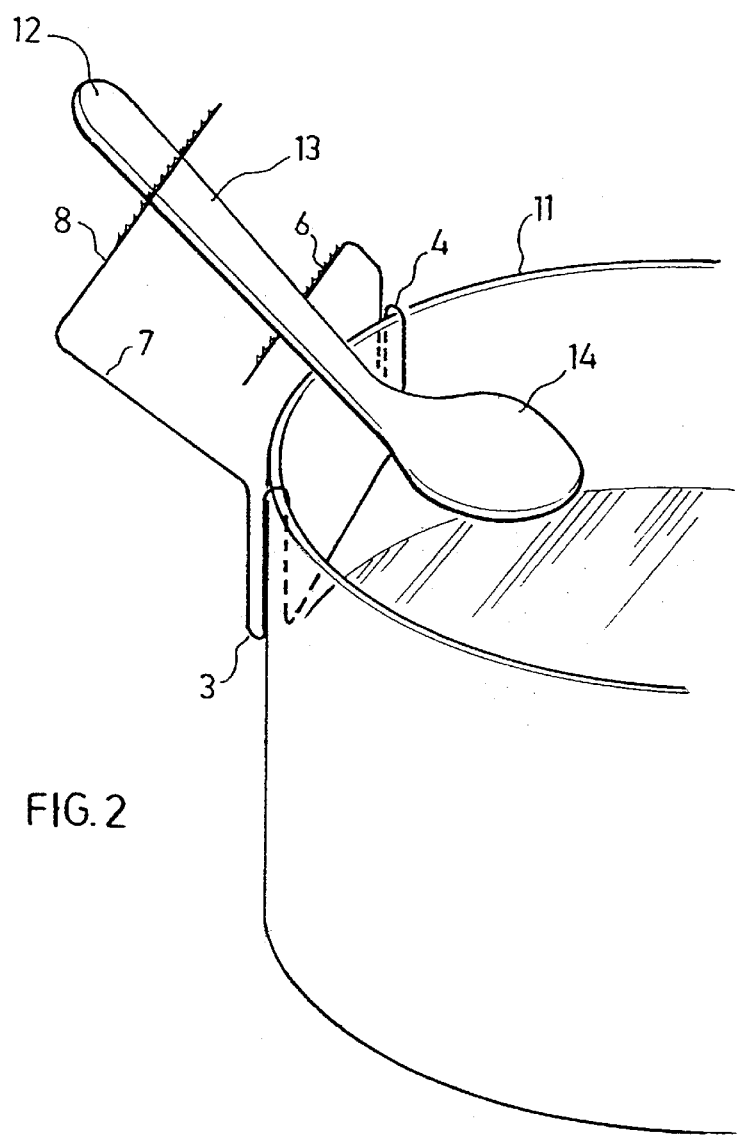
FIG. 2 illustrates one application of such a holder for holding a stirring spoon with respect to a cooking pot.

The holder illustrated in FIGS. 1 and 2 of the drawings, and therein generally designated 2, is of a one-piece construction made of wire bent into the specific configuration illustrated in the drawings. The wire may be of metal, e.g., 1.0–2.5 mm diameter stainless steel. It could also be of any suitable plastic material, or of metal coated with a plastic or ceramic material.

Holder 2 is bent to define an attaching section, constituted of two U-shaped bends 3, 4, joined together by a bridge 5. one end of the one-piece wire unit terminates in a finger 6 integrally formed with the U-bend 4; whereas the opposite end of the one-piece wire unit includes a leg 7 integrally formed with U-bend 3 and terminating in a second finger 8.

As shown particularly in FIG. 2, the mid-portion of the one-piece wire unit, including the two U-shaped bends 3, 4 and the connecting bridge 5, is applied over the rim of the cooking pot, therein designated 11 and is used for holding a stirring spoon 12 when the stirring spoon is not being used for stirring the food being cooked. Thus, when the one-piece wire unit is attached to the cooking pot 11, the two fingers 6 and 8 constitute holding sections for holding the stirring spoon over the cooking pot. Thus, the two fingers 6 and 8 extend in spaced parallel relation to each other such that when handle 13 of the stirring spoon 12 is received between them, the upper surface of finger 6 engages the under surface of the inner end of handle 13, and the weight of spoon 14 produces a rotary moment around finger 6 pressing the upper surface of the outer end of handle 13 firmly against the under surface of finger 8, to hold the cooking spoon 12 between the two fingers.

It will also be seen that finger 8 is at a higher elevation than finger 6 when the holder is attached to the rim of the cooking pot 11. The two fingers 6, 8 will therefore hold the stirring spoon 12 at a declination in the inward direction of the cooking pot 11, with the spoon end 14 overlying the interior of the receptacle. Thus, not only is the cooking spoon 12 held spaced from the cooking pot 11 so as not to be overheated by it, but also, it is held at a downward incline so that its drippings return back into the cooking pot. Moreover, holder 2, even with the stirring spoon 12 held thereby, can not only be retained on the cooking pot 11 during the cooking time, but also allows the lid (not shown) to be placed on the cooking pot producing a slow venting of the food while it is being cooked.

Preferably, the bridge 5 between the two U-shaped bends 3, 4, of the holder 2 is sufficiently long and stiff to enable the holder to be applied to cooking pots or other receptacles of different diameters. In addition, the two fingers 6, 8 are preferably provided with outer surfaces of increased friction to prevent slippage of the stirring spoon 12, or other article, held by the holder. Such increased friction may be produced by roughening the outer surfaces of the two fingers 6, 8, by providing them with a coating or sleeve of a plastic or ceramic material. Such a coating or sleeve also reduces the heat transfer from the cooking pot to the stirring spoon.

FIGS. 3 and 4 illustrate another holder, generally designated 20, constructed in accordance with the present invention also in the form of a one-piece unit made of bent wire. Thus, holder 20 illustrated in FIGS. 3 and 4 includes an attaching section 22 in the form of two coaxial loops 23, 24 adapted to receive between the mounting member, such as the rim of a container. Because of the elasticity of the wire used for making the holder 20, the two loops 23, 24 may be pushed apart sufficiently to slip the rim of the receptacle between them, thereby firmly retaining the holder so attached to the receptacle rim.

The attaching section 22 of holder 20 terminates in a U-shaped extension constituted of three legs 26, 27 and 28. Legs 26 and 28 are substantially parallel to each other and serve the function of the two holding sections, corresponding to holding fingers 6 and 8 in the holder of FIGS. 1 and 2, They may be similarly provided with outer surfaces of increased friction to prevent slippage of the article held thereby.

FIG. 4 illustrates the holder 20 of FIG. 3 used for holding a paint brush 32 over a can of paint 31. Thus, the holder is easily attached to the can of paint 31 by inserting the rim of the can between the two loops 23, 24, thereby enabling the two legs 26, 28 to receive the handle 33 of the paint brush 32 between them and to be firmly retained in place by the weight of the paint brush 34, while at the same permitting the paint to drain into the can.

Figure 5:
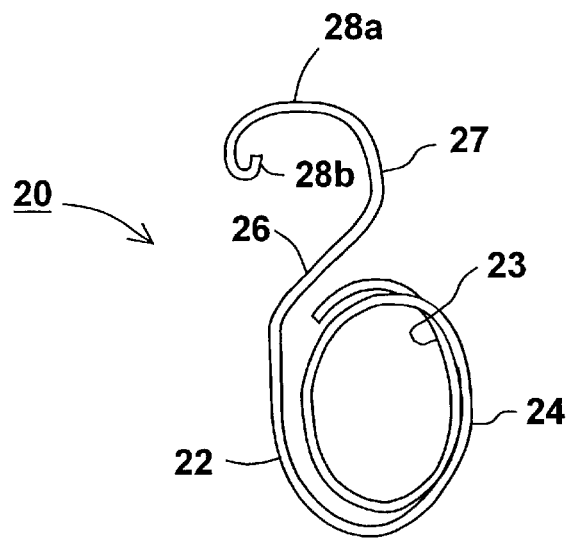
FIG. 5 illustrates a modification in the holder of FIGS. 3 and 4.

FIG. 5 illustrates the holder of FIGS. 3 and 4 but of a slightly modified construction, in that leg 28 is provided with a concave recess 28a and terminates in a bead or lip 28b. Such a modification tends to self-center the handle of the article when applied to the holder and also to retain it in place.

Figure 6:
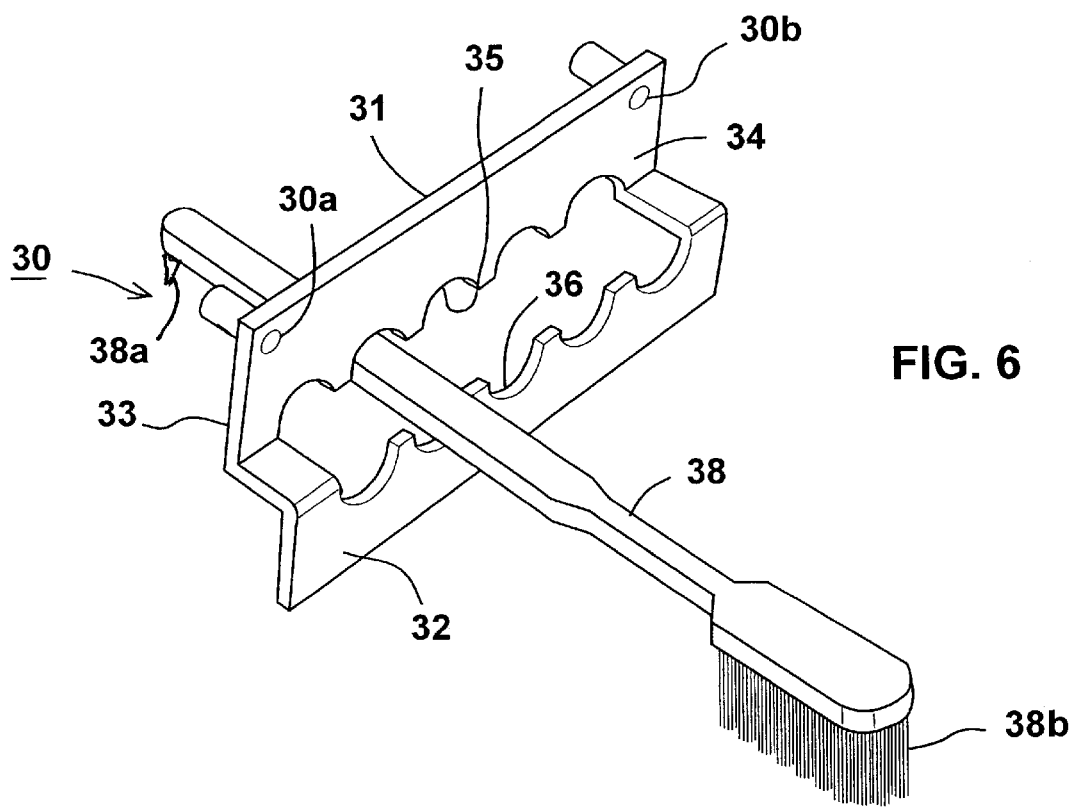
FIG. 6 illustrates another holder construction in accordance with the present invention particularly useful for holding a plurality of toothbrushes.

FIG. 6 illustrates a further holder construction particularly useful for holding a plurality of toothbrushes. The holder illustrated in FIG. 6 can be constructed in the form of a bracket 30 to be attached to the wall via openings 30a, 30b. The holder includes a pair of holding sections or arms 31, 32 extending in parallel spaced relationship, joined at their opposite sides by stepped bridges 33, 34 integrally formed with the arms. Bridges 33 and 34 space the lower arm 32 in both the horizontal and vertical directions with respect to arm 31, so that the lower edge 35 of arm 31 is located above and rearwardly of the upper edge 36 of arm 32. In addition, the confronting edges 35, 36 of the two arms 31 and 32 are formed with a series of concave recesses so as to receive a plurality of toothbrushes 38 in side-by-side relationship.

It will thus be seen that each of the concave recesses in the confronting surfaces 35, 36 of the two arms 31, 32 is adapted to receive the handle of a toothbrush 38 and to stably support it with the opposite ends 38a, 38b of the toothbrush exposed to air. Such a holder is particularly useful with respect to toothbrushes provided at one end with a rubber pick, as shown at 38a, and a brush head 38b at the opposite end, since both ends are thus exposed to air. Also, the device minimizes dripping, and accommodates different sizes.

Figure 7:
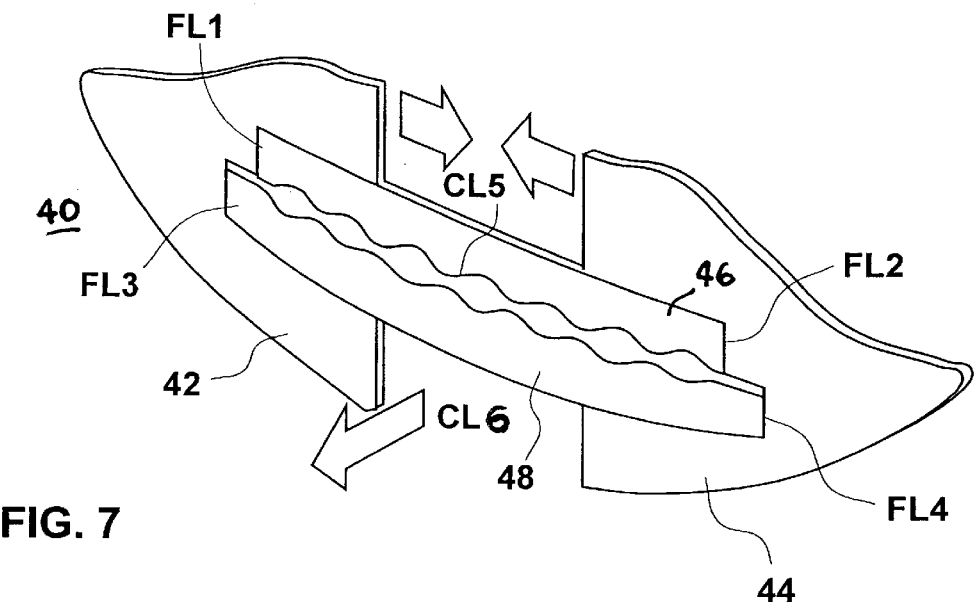
FIG. 7 is a three-dimensional view illustrating another article holder constructed in accordance with the present invention, the article holder being shown in its initial flat condition.
Figure 8:
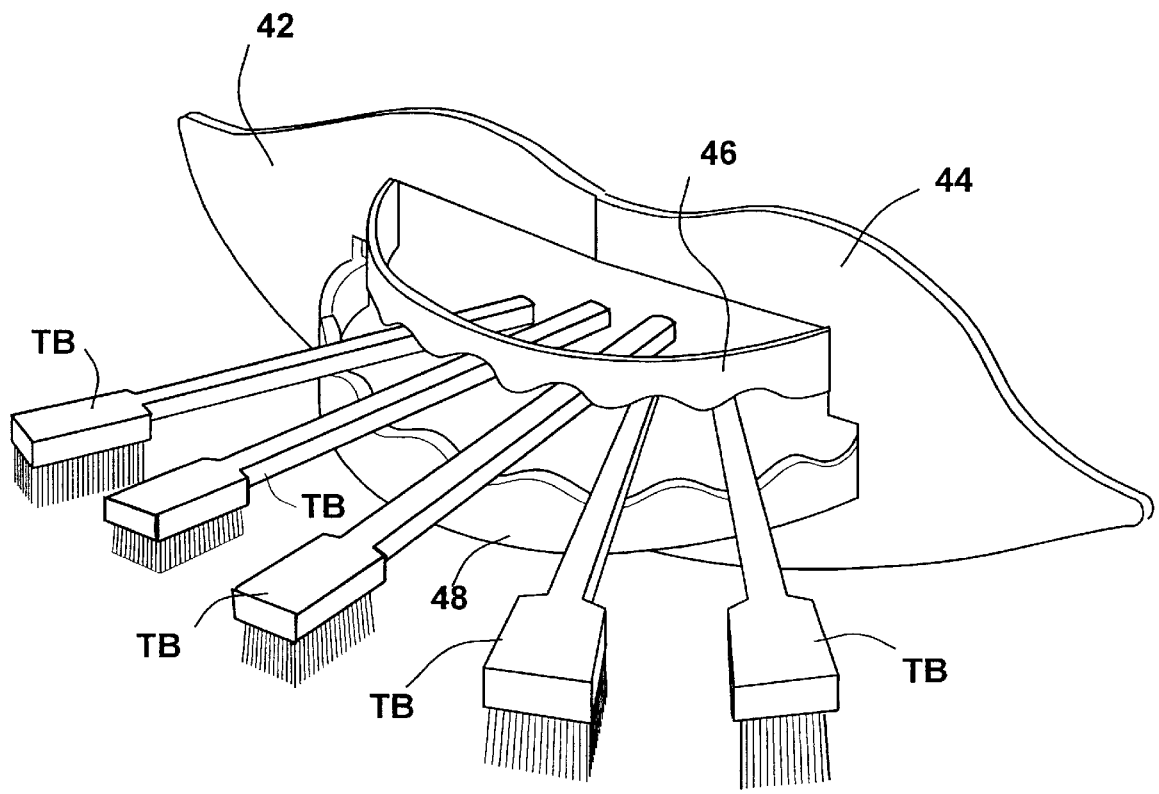
FIG. 8 is a three-dimensional view illustrating the article holder of FIG. 7 in its mounting or deployed condition.

The article holder illustrated in FIGS. 7–10 of the drawings is particularly useful for holding a plurality of toothbrushes or similar type articles. FIG. 8 illustrates the article holder in its deployed condition wherein it assumes a three-dimensional configuration for supporting a plurality of toothbrushes. However, as shown in FIG. 7, the article holder may be produced in the form of a flat blank 40, thereby substantially reducing its manufacturing costs, and its volume when stored, shipped, and otherwise handled until its actual use.

Figure 9:
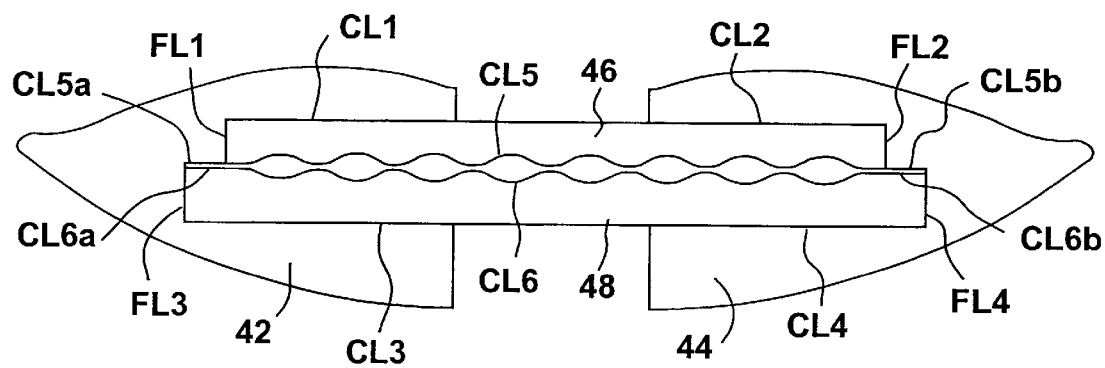
FIG. 9 is a front elevational view of the article holder blank in its original flat condition as shown in FIG. 7.
Figure 10:
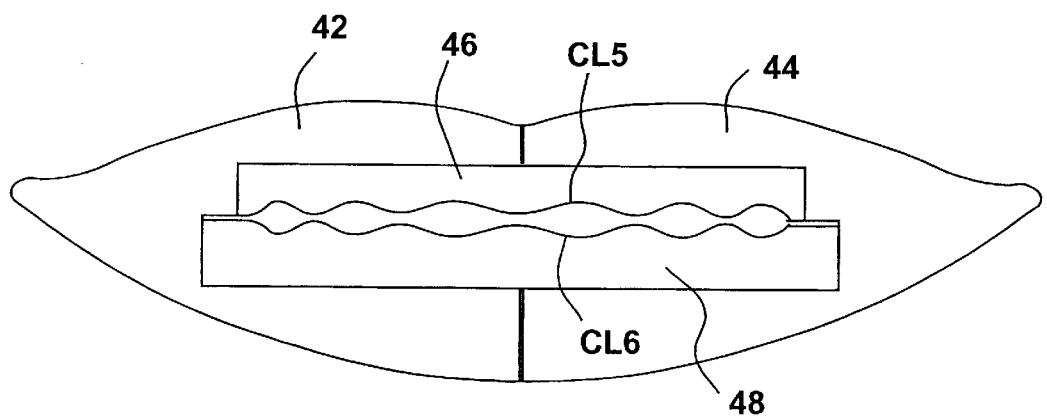
FIG. 10 is a front elevational view of the article holder in its mounting condition as shown in FIG. 8.

As shown particularly in FIG. 9, the blank 40, in its initial flat condition, is constructed with a pair of side sections 42, 44, spaced laterally apart, and a pair of bridgeing strips 46, 48, extending between the two side sections. Strips 46, 48 are adapted to form bowed arms, as shown particularly in FIG. 8, when the two side section are moved towards each other into abutting contact at their flat facing edges, as shown in FIG. 10, when the device is to be mounted at the point of use. For this purpose, the two strips 46, 48, are joined to the two side sections 42, 44 of the blank, by a plurality of horizontal cut lines $CL_1$–$CL_4$ (FIG. 9), and a plurality of vertical fold lines $FL_1$–$FL_4$. In addition, the two strips 46, 48, are separated from eachother by further horizontal cut lines $CL_5$, $CL_6$.

The latter horizontal cut line $CL_5$, $CL_6$ are formed with a ripple or scalloped configuration, to thereby define facing edges having a plurality of concave recesses tending to self-center the toothbrushes when supported by the article holder, as shown in FIG. 8.

The upper strip 46 is cut from the two end section 42, 44, by horizontal cut lines $CL_1$, $CL_2$ at the upper edge of the opposite ends of the strip; and strip 46 is joined to the two end sections 42, 44, by vertical fold lines $FL_1$, $FL_2$ at the opposite ends of the strip. Similarly, the lower strip 48, is cut from the two end sections 42, 44 by horizontal cut lines $CL_3$, $CL_4$ at the opposite ends of the lower edge of the strip; and strip 48 is joined to the two end sections 42, 44, by vertical fold lines $FL_3$, $FL_4$ at the opposite ends of the strip.

As can be seen particularly in FIG. 9, the two vertical fold lines $FL_3$, $FL_4$ at the lower end of strip 48 are spaced farther apart than the vertical fold lines $FL_1$, $FL_2$ at the opposite ends of strip 46. As also seen in FIG. 9, the end portions of the two horizontal cut lines $CL_5$, $CL_6$, between fold lines $FL_1$, $FL_3$ on one side, and fold lines $FL_2$ and $FL_4$ on the opposite side, are straight, i.e. non-rippled, as shown at $CL_{5a}$, $CL_{5b}$ and $CL_{6a}$, $CL_{6b}$, respectively. With such a construction, when the flat blank 40 is deployed to its mounting condition by moving the two end section 42, 44, into abutting contact at their flat facing edges, as shown particularly in FIG. 8, both strips 46 and 48 produce bowed arms, with the bowed arm of the lower strip 48 extending below and spaced forwardly of the bowed arm of the upper strip 46.

Such an arrangement permits the toothbrushes TB to be conveniently applied with the brush head facing outwardly, as shown in FIG. 8. The weight of the brush head produces a rotary movement causing the upper surface of the brush handle to be pressed against the lower surface of the upper arm 46, and the lower surface of the brush handle to be pressed against the upper surface of arm 48, thereby holding the toothbrush in a manner enabling it to be conveniently removed as desired. It will also be seen that the rippled facing edges of the two arms 6, 8, produce concave surfaces which tend to self-center the toothbrushes when so supported by the holder.

Figure 11:
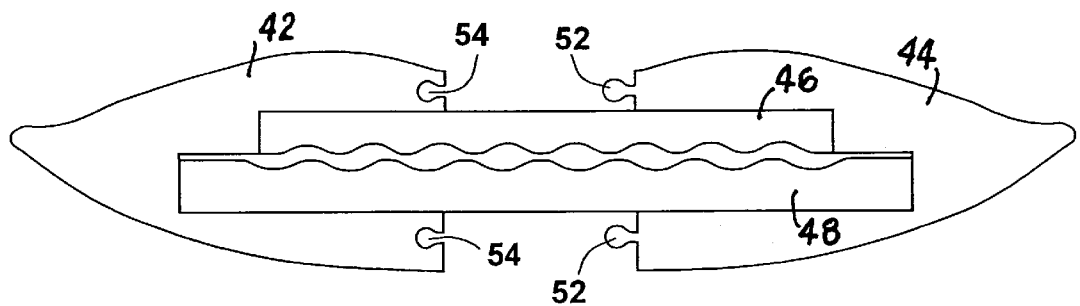
FIGS. 11 and 12 are front and rear views, respectively, illustrating modifications in the construction of the blank of FIG. 7.
Figure 12:
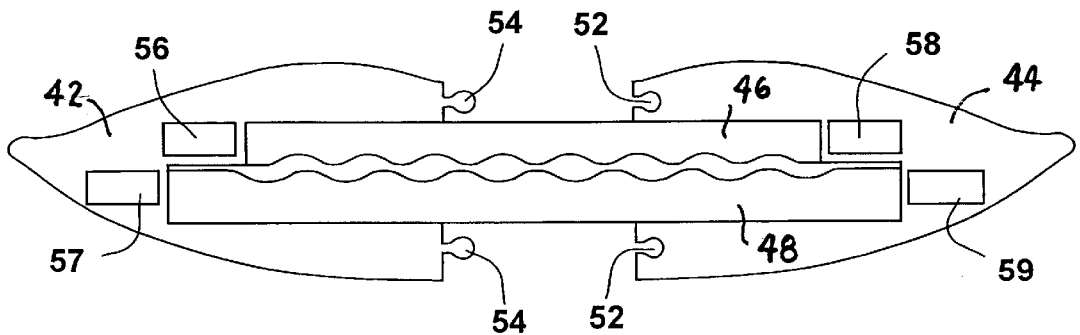

FIGS. 11 and 12 are front and rear views respectively, of a blank similar to that described above with respect to FIGS. 7–10, but including the following modifications: The blank is cut to define tongues 52 and complementary recesses 54 in the abutting edges of the side sections 42, 44 to aid in retaining them in abutting contact when moved together as shown in FIG. 8. Also, the rear faces of the side sections 42, 44 are provided with adhesive strips 56, 57, 58, 59, each covered by a removable protective liner, for adhesively mounting the blank to a vertical supporting member (e.g., the wall) as shown in FIG. 8.

While the invention has been described with respect to several preferred embodiments, it will be appreciated that these are set forth merely for purposes of example, and that many modifications may be made. For example, in the FIGS. 1 and 2, holder the mid-section including the two U-bends 3, 4, and the bridge 5, need not be stiff; also, they could be constructed as a separate unit, and the two fingers 6, 8, could be attached to them. Further, the unit could be constructed of a bent strip of plastic or metal, rather than of bent wire. Also, the holder, particularly that of FIG. 6, could be constructed as a stand-alone device. In addition, the described holders could be designed for holding various working tools, writing implements, or the like to a wall-mounted bracket or to a stand-alone unit.

Further, in the embodiments illustrated in FIGS. 7–11, the flat blank could be produced by injection molding plastic, as well as by stamping plastic, cardboard, etc. sheets. Also, instead of merely abutting the edges to the pair of side sections (42, 44) as illustrated in FIGS. 7–10, or providing tongue-and-recess retainers as illustrated in FIGS. 11, 12, the edges of the side sections could be made to overlap and to be retained by snap-on fasteners, adhesive, "Velcro" (Reg. TM) fastener strips, or other means. The embodiments of FIGS. 7–11 can be produced in volume and at low cost such as to enable them to be used as "give-away" items in promoting the sale of various products, such as toothbrushes, tooth paste, etc.

Many other variations, modifications and applications of the invention will be apparent.

What is claimed is:

1. A flat blank of stiff sheet material for mounting to a vertical member to serve as an article holder for holding articles, said flat blank being configured, and being provided with cut lines and fold lines, to define:

a pair of side sections spaced laterally apart;

and a pair of strips, constituting an upper strip and a lower strip, separated from each other by said cut lines and joined to said side sections by said fold lines such that when the two side sections of the flat blank are moved toward each other to a mounting condition for mounting the blank to the vertical member to serve as an article holder, the pair of strips become bowed outwardly of the side sections in the same direction for their complete lengths to said side sections and produce upper and lower bowed arms for supporting the articles between them;

wherein said cut lines and fold lines produce, in the mounting condition of the blank, said upper and lower bowed arms in which the lower bowed arm extends below, is of a longer length than, and is spaced forwardly of, the upper bowed arm.

2. The blank according to claim 1, wherein said cut lines include cut lines of ripple configuration between the pair of strips producing the bowed arms in the mounting condition of the blank to define facing edges formed with a plurality of concave recesses tending to self-center the articles when engaging and supported by the bowed arms.

3. The blank according to claim 1, wherein the blank is configured and cut to define flat facing edges in the pair of side sections to be brought into abutment with each other in the mounting conditon of the blank.

4. The blank according to claim 1, wherein the blank is formed with:

first and second horizontal cut lines between the pair of side sections and upper edges of the opposite ends of the upper strip;

third and fourth horizontal cut lines between the pair of side sections and lower edges of the opposite ends of the lower strip;

fifth and sixth horizontal cut lines defining the lower edge of the upper strip and the upper edge of the lower strip, respectively;

first and second vertical fold lines at the opposite ends of the upper strip extending between the fifth horizontal cut line, and the first and second horizontal cut lines, respectively;

and third and fourth vertical fold lines at the opposite ends of the lower strip extending between the sixth horizontal cut line and the third and fourth horizontal cut lines, respectively.

5. The blank according to claim 4, wherein said third and fourth vertical fold lines are spaced farther apart from the first and second vertical fold lines such that, in the mounting condition of the blank, the pair of strips define said upper and lower bowed arms in which the lower bowed arm extends below and is spaced forwardly of the upper bowed arm.

6. The blank according to claim 4, wherein said fifth and sixth horizontal cut lines are of ripple configuration such that, in the mounting condition of the blank, said ripple lines define concave recesses between the lower edge of the upper bowed arm and the upper edge of the lower bowed arm tending to self-center the articles when supported by said arms.

7. The blank according to claim 1, wherein the blank is cut to define tongues and complementary recesses in the pair of side sections to aid in retaining the side sections when moved towards each other in the mounting conditon of the blank.

8. The blank according to claim 1, wherein the pair of side sections have rear faces provided with adhesive strips for adhesively mounting the blank to the vertical member.

* * * * *